A. D. HUGHES.
GYRATORY SIFTER.
APPLICATION FILED AUG. 21, 1912.
1,067,920.
Patented July 22, 1913.
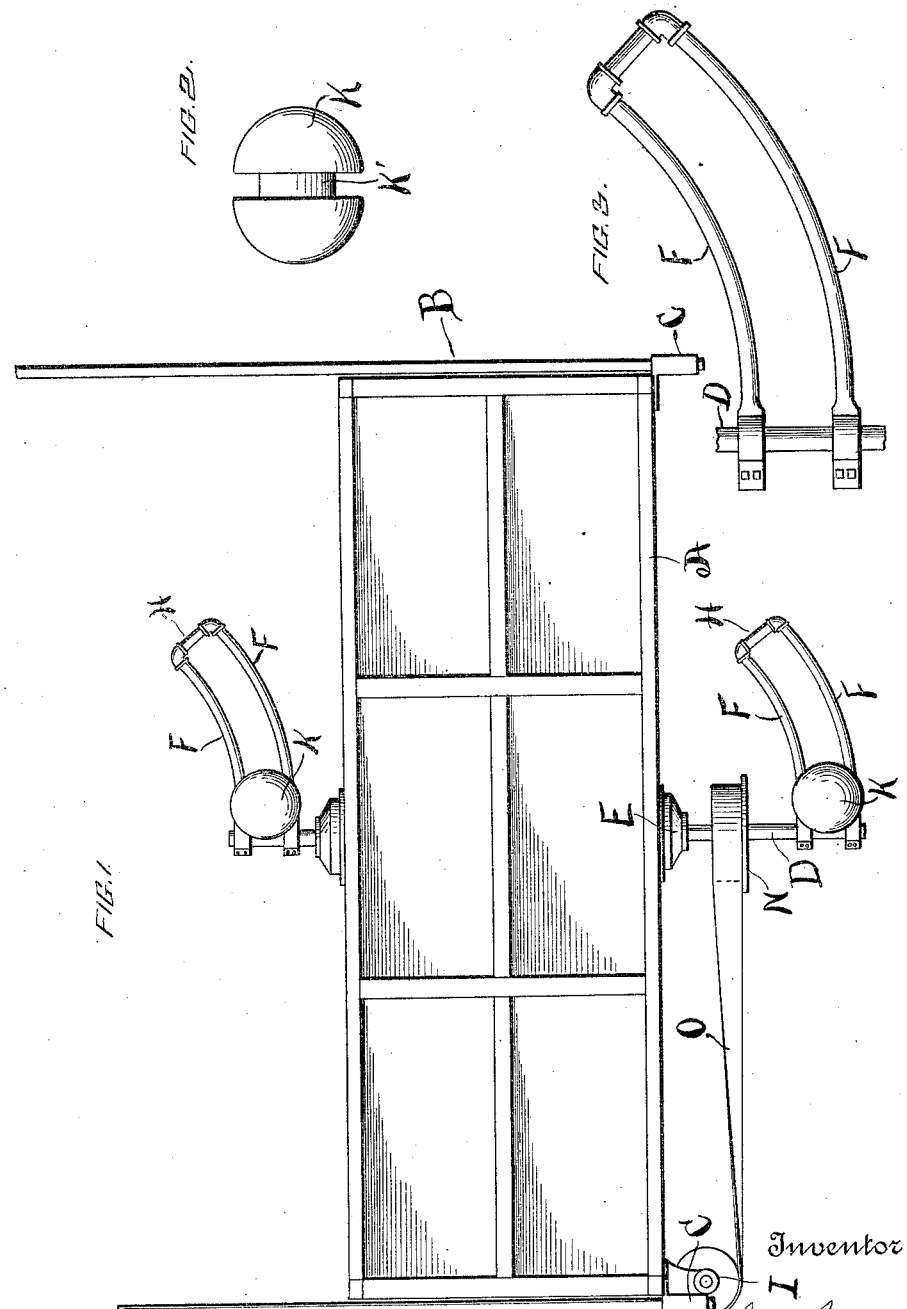

UNITED STATES PATENT OFFICE.

ARTHUR D. HUGHES, OF ROCHESTER, INDIANA.

GYRATORY SIFTER.

1,067,920.       Specification of Letters Patent.       Patented July 22, 1913.

Application filed August 21, 1912. Serial No. 716.272.

*To all whom it may concern:*

Be it known that I, ARTHUR D. HUGHES, a citizen of the United States, residing at Rochester, in the county of Fulton and State of Indiana, have invented certain new and useful Improvements in Gyratory Sifters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in gyratory sifters for milling purposes and comprises a simple and efficient device of this nature having various details of construction and combinations and arrangements of parts which will be hereinafter fully described, shown in the accompanying drawings and then specifically defined in the appended claim.

My invention is illustrated in the accompanying drawings, in which:—

Figure 1 is a side elevation of my gyratory sifter. Fig. 2 is a detail view of one of the centrifugally operated rolling members, and Fig. 3 is a detail view of a raceway.

Reference now being had to the details of the drawings by letter, A designates a sifter which may be of any improved construction and is suspended by means of reeds B from a fixed object allowing the sifter to swing freely. Said reeds are fastened preferably at their lower ends to the bracket members C at the corners of the sifter. A vertically disposed rotatable shaft D is mounted in suitable bearings within the sifter, the bearings, designated by letter E, being preferably of the ball bearing type. Fixed near each end of the shaft are the two raceways F, each made up of two curved longitudinal rods which are connected together at their outer ends by cross-pieces H and said sides F are parallel to each other. A centrifugally operated rolling member K, a detail of which is shown in Fig. 2 of the drawings, has a central annular groove K' adapted to receive the two sides F of the raceway at points diametrically opposite, said sides serving as tracks to guide the roller as it is swung out by centrifugal force. A flanged pulley N is fixed to the shaft D below the sifter and a belt O passes about said flanged pulley and an idler I journaled in suitable bearings upon the sifter and is driven from any source of supply not shown.

The operation of my invention will be readily understood and is as follows:—The parts being adjusted as shown, the rolling centrifugally operating members K normally assume the positions shown in Fig. 1 in which they rest against the shaft D. As a rotary movement is imparted to the shaft D, the raceways will be made to rotate with the shaft and the rolling members will be thrown outward from the shaft and swinging therewith will cause a gyratory movement to be imparted to the sieve. When the shaft is at rest, the balls will return to their normal positions and the sifter will seek its equilibrium.

What I claim to be new is:—

A gyratory structure, a shaft mounted in suitable bearings therein, pulleys, one mounted upon the structure and the other fixed to the shaft, belted connections with said pulleys, curved arms fastened to the projecting ends of the shaft, parallel to each other and having their outer ends connected, a roller weight with an annular groove engaging said curved arms to guide the roller weights, as set forth.

In testimony whereof I hereunto affix my signature in the presence of two witnesses.

ARTHUR D. HUGHES.

Witnesses:
CHARLES A. BURNS,
E. C. MERCER.

---

Copies of this patent may be obtained for five cents each, by addressing the "Commissioner of Patents, Washington, D. C."